US010672039B2

(12) United States Patent
Subramanian et al.

(10) Patent No.: US 10,672,039 B2
(45) Date of Patent: Jun. 2, 2020

(54) ASSEMBLING INTERNET DISPLAY PAGES WITH CONTENT PROVIDED FROM MULTIPLE SERVERS AFTER FAILURE OF ONE SERVER

(71) Applicant: PulsePoint, Inc., New York, NY (US)

(72) Inventors: Anand Subramanian, New York, NY (US); Shanthi Sarkar, New York, NY (US); Jeremy Sterns, New York, NY (US)

(73) Assignee: PulsePoint, Inc., New York, NY (US)

( * ) Notice: Subject to any disclaimer, the term of this patent is extended or adjusted under 35 U.S.C. 154(b) by 915 days.

(21) Appl. No.: 14/266,013

(22) Filed: Apr. 30, 2014

(65) Prior Publication Data
US 2014/0236738 A1    Aug. 21, 2014

Related U.S. Application Data

(63) Continuation of application No. 11/502,751, filed on Aug. 11, 2006, now Pat. No. 8,751,302.
(Continued)

(51) Int. Cl.
G06Q 30/00        (2012.01)
G06Q 30/02        (2012.01)

(52) U.S. Cl.
CPC ......... G06Q 30/0277 (2013.01); G06Q 30/02 (2013.01); G06Q 30/0243 (2013.01); G06Q 30/0273 (2013.01)

(58) Field of Classification Search
CPC ....................................................... G06Q 30/02
(Continued)

(56) References Cited

U.S. PATENT DOCUMENTS 4,723,212 A    2/1988  Mindrum et al.
4,914,590 A    4/1990  Loatman et al.
(Continued)

FOREIGN PATENT DOCUMENTS

AU    6617700 A    2/2001
EP    0443503 B1   7/1997
(Continued)

OTHER PUBLICATIONS

"Infoseek Spin-Off Makes News Real", Multimedia Daily, vol. 5, Issue 22, BRP Publications (Feb. 4, 1998).
(Continued)

Primary Examiner — Sun M Li
(74) Attorney, Agent, or Firm — David E. Boundy; Cambridge Technology Law LLC

(57) ABSTRACT

Presented are embodiments of methods and systems that provide for Internet advertisement pricing and placement to be variably based on the advertisement's performance within a given category of Internet media, while at the same time achieving predictable delivery and pricing for both advertisers and publishers. Techniques are presented where an advertiser's online campaign will be pre-empted only for underperformance on its own merits, and not for its relative performance or price versus other advertisers. Further, techniques are presented for allowing publishers of advertisements to realize increased revenue from their high value media while using tag passbacks to secure a minimum reserve pricing of their choice.

28 Claims, 15 Drawing Sheets

Related U.S. Application Data

(60) Provisional application No. 60/707,869, filed on Aug. 11, 2005.

(58) Field of Classification Search
USPC .............................. 705/14.71, 14.73, 14.41
See application file for complete search history.

(56) References Cited

U.S. PATENT DOCUMENTS

| | | |
|---|---|---|
| 4,996,642 A | 2/1991 | Hey |
| 5,105,184 A | 4/1992 | Pirani et al. |
| 5,353,218 A | 10/1994 | De Lapa et al. |
| 5,401,946 A | 3/1995 | Weinblatt |
| 5,435,087 A | 7/1995 | Karkar et al. |
| 5,459,306 A | 10/1995 | Stein et al. |
| 5,483,650 A | 1/1996 | Pedersen et al. |
| 5,483,763 A | 1/1996 | Liu |
| 5,583,763 A | 12/1996 | Atcheson et al. |
| 5,621,812 A | 4/1997 | Deaton et al. |
| 5,636,346 A | 6/1997 | Saxe |
| 5,696,962 A | 12/1997 | Kupiec |
| 5,724,521 A | 3/1998 | Dedrick |
| 5,742,768 A | 4/1998 | Gennaro et al. |
| 5,754,938 A | 5/1998 | Herz et al. |
| 5,761,655 A | 6/1998 | Hoffman |
| 5,822,748 A | 10/1998 | Cohen et al. |
| 5,832,474 A | 11/1998 | Lopresti et al. |
| 5,835,087 A | 11/1998 | Herz et al. |
| 5,838,317 A | 11/1998 | Bolnick et al. |
| 5,848,408 A | 12/1998 | Jakobsson et al. |
| 5,855,008 A | 12/1998 | Goldhaber et al. |
| 5,864,863 A | 1/1999 | Burrows |
| 5,918,014 A | 6/1999 | Robinson |
| 5,930,764 A | 7/1999 | Melchione et al. |
| 5,943,648 A | 8/1999 | Tel |
| 5,943,679 A | 8/1999 | Niles et al. |
| 5,948,061 A | 9/1999 | Merriman et al. |
| 5,961,593 A | 10/1999 | Gabber et al. |
| 5,974,408 A | 11/1999 | Cohen et al. |
| 5,987,454 A | 11/1999 | Hobbs |
| 5,991,735 A | 11/1999 | Gerace |
| 6,006,197 A | 12/1999 | d'Eon et al. |
| 6,009,410 A | 12/1999 | LeMole et al. |
| 6,016,487 A | 1/2000 | Rioux et al. |
| 6,018,734 A | 1/2000 | Zhang et al. |
| 6,026,409 A | 2/2000 | Blumenthal |
| 6,044,376 A | 3/2000 | Kurtzman, II |
| 6,081,750 A | 6/2000 | Hoffberg et al. |
| 6,094,681 A | 7/2000 | Shaffer |
| 6,104,503 A | 8/2000 | Shimura et al. |
| 6,134,532 A | 10/2000 | Lazarus et al. |
| 6,141,010 A | 10/2000 | Hoyle |
| 6,185,614 B1 | 2/2001 | Cuomo et al. |
| 6,189,003 B1 | 2/2001 | Leal |
| 6,236,978 B1 | 5/2001 | Tuzhilin |
| 6,253,188 B1 | 6/2001 | Witek et al. |
| 6,256,633 B1 | 7/2001 | Dharap |
| 6,308,202 B1 | 10/2001 | Cohn et al. |
| 6,317,718 B1 | 11/2001 | Fano |
| 6,327,574 B1 | 12/2001 | Kramer et al. |
| 6,327,590 B1 | 12/2001 | Chidlovskii et al. |
| 6,339,761 B1 | 1/2002 | Cottingham |
| 6,356,899 B1 | 3/2002 | Chakrabarti et al. |
| 6,366,298 B1 | 4/2002 | Haitsuka et al. |
| 6,381,465 B1 | 4/2002 | Chern |
| 6,453,315 B1 | 9/2002 | Weissman |
| 6,526,440 B1 | 2/2003 | Bharat |
| 6,529,903 B2 | 3/2003 | Smith et al. |
| 6,615,209 B1 | 9/2003 | Gomes et al. |
| 6,629,092 B1 | 9/2003 | Berke |
| 6,658,423 B1 | 12/2003 | Pugh et al. |
| 6,668,256 B1 | 12/2003 | Lynch |
| 6,678,681 B1 | 1/2004 | Brin |
| 6,725,203 B1 | 4/2004 | Seet et al. |
| 6,725,259 B1 | 4/2004 | Bharat |
| 6,754,873 B1 | 6/2004 | Law et al. |
| 6,804,659 B1 | 10/2004 | Graham et al. |
| 6,955,908 B1 | 10/2005 | Lambl |
| 7,058,592 B1 | 6/2006 | Heckerman |
| 7,076,443 B1 | 7/2006 | Emens et al. |
| 7,089,194 B1 | 8/2006 | Berstis |
| 7,149,741 B2 | 12/2006 | Burkey et al. |
| 7,257,589 B1 | 8/2007 | Hull et al. |
| 7,337,127 B1 | 2/2008 | Smith |
| 7,353,246 B1 | 4/2008 | Rosen et al. |
| 7,472,102 B1 | 12/2008 | Heckerman |
| 7,584,120 B1 | 9/2009 | Yun |
| 7,945,476 B2 | 5/2011 | Subramanian |
| 2002/0010625 A1 | 1/2002 | Smith et al. |
| 2002/0042791 A1 | 4/2002 | Smith et al. |
| 2002/0107735 A1 | 8/2002 | Henkin et al. |
| 2002/0120503 A1 | 8/2002 | Iwayama et al. |
| 2002/0123912 A1 | 9/2002 | Subramanian et al. |
| 2002/0123988 A1 | 9/2002 | Dean et al. |
| 2002/0133481 A1 | 9/2002 | Smith et al. |
| 2002/0154162 A1 | 10/2002 | Bhatia et al. |
| 2002/0184088 A1 | 12/2002 | Rosenberg |
| 2004/0059708 A1 | 3/2004 | Dean et al. |
| 2004/0119740 A1 | 6/2004 | Chang et al. |
| 2004/0122811 A1 | 6/2004 | Page |
| 2004/0186776 A1* | 9/2004 | Llach ................ G06Q 30/02 705/14.66 |
| 2005/0165615 A1 | 7/2005 | Minar |
| 2007/0067215 A1* | 3/2007 | Agarwal ............ G06Q 30/02 705/14.69 |

FOREIGN PATENT DOCUMENTS

| | | |
|---|---|---|
| WO | WO1999/046719 A1 | 9/1999 |
| WO | WO1999/063453 A1 | 12/1999 |
| WO | WO2000/058897 A2 | 10/2000 |
| WO | WO2001/044992 A1 | 6/2001 |
| WO | WO2001/057721 A2 | 8/2001 |
| WO | WO2001/090956 | 11/2001 |
| WO | WO2002/037220 A2 | 5/2002 |

OTHER PUBLICATIONS

"Yellowbrix Promises Gold", Interactive PR & Marketing News, vol. 6, Issue 24, Phillips Business Information (Nov. 26, 1999).
Dvorak, John C., "Advertising Just for You", Boardwalk Magazine, pp. 142-143, vol. 13, No. 12 (Dec. 1999).
"NewsReal Changes Name to YellowBrix; Bridges the Gap Between Content and Commerce; YellowBrix Technology 'Makes Web Sites Smart' by Advancing Access to Content and Commerce", PR Newswire, Financial News, PR Newswire Association, Inc. (Feb. 28, 2000).
Bob Tedeschi, Spy on Your Customers (They Want You to)—New Web Tracking Technology Turns Browsers Into Paying Customers (Company Business and Marketing), Ziff Davis Smart Business for the New Economy 58, ISSN: 1528-4034 (Aug. 1, 2001).
Notification of Transmittal of the International Search Report or the Declaration and Search for PCT/US01/45483 (dated Aug. 28, 2002).
International Search Report, PCT/US01/45483 (dated Aug. 28, 2002).
International Preliminary Examination Report, PCT/US01/45483 (dated Jan. 31, 2003), to which the present application is the U.S. National Phase Application under 35 U.S.C. § 371.
International Preliminary Examination report, PCT/US01/45483 (dated Jan. 31, 2003).
Notification of Transmittal of International Preliminary Examination Report for PCT/US01/45483 (dated Jan. 31, 2003).
New Media Age, p. S16, Centaur Communications Ltd. (Feb. 19, 2004).
International Search Report, PCT/US2006/031744 (dated Sep. 18, 2007).
Written Opinion of the International Searching Authority, PCT/US2006/031744 (dated Sep. 18, 2007).

(56) References Cited

OTHER PUBLICATIONS

International Preliminary Report on Patentability, PCT/US2006/031744 (dated Feb. 12, 2008).
Reply to Office Action in U.S. Appl. No. 11/929,585 (dated Dec. 31, 2008).
Reply to Office Action in U.S. Appl. No. 11/929,585 (dated Jul. 2, 2009).
Reply to Office Action in U.S. Appl. No. 11/929,563 (dated Oct. 7, 2009).

* cited by examiner

FIGURE 15

ASSEMBLING INTERNET DISPLAY PAGES WITH CONTENT PROVIDED FROM MULTIPLE SERVERS AFTER FAILURE OF ONE SERVER

CLAIM OF PRIORITY

This application claims priority to and is a continuation of pending U.S. application Ser. No. 11/502,751, filed Aug. 11, 2006, which claims the benefit of priority, under 35 U.S.C. § 119(e), to U.S. Provisional Application No. 60/707,869, filed Aug. 11, 2005, and titled "Method and System for Placement and Pricing of Internet-Based Advertisements or Services," which is hereby incorporated by reference in its entirety.

FIELD OF INVENTION

The present invention relates to selecting the best performing advertisements for Internet users, and to a pricing model that determines an appropriate price for those advertisements, and in particular to pricing and ranking ads in an inventory of ads so as to achieve predictable delivery for advertisers while maximizing property value for publishers and networks.

BACKGROUND OF THE INVENTION

When advertisers purchase distribution for their ads on a web site or set of web sites, there are a few standard ways they can pay for that. The simplest models are:

1. A fixed cost per thousand impressions ("CPM model"). If an advertiser pays a fixed rate CPM (e.g., $1.00), they pay the fixed rate of $1 for every thousand times their ad is shown (impression), regardless of user response rate to that ad.

2. A fixed cost-per-click model ("CPC"). If an advertiser pays a fixed rate (e.g., $1) CPC, they pay $1 every time a user clicks on that ad, regardless of the number of times the ad is shown without being clicked.

However in many situations the market value of ad space may vary. For example, if the ad is to be matched to a keyword on an active search page or in contextual advertising, then the value of that ad space depends on the market value for that keyword (e.g., "casino" is typically more valuable for advertising than "paper").

As a result, auction models have become common. In this case advertisers bid on how much they're willing to pay—typically on a CPC basis—to have their ad shown on those pages, against that keyword or context, etc. An ad server implements the placement algorithm and is able to maximize the value of that ad space by selecting the highest paying ads at any given time. In some cases the ad server will also combine performance data for that ad (including click-through-rate ("CTR") data, for example) with the bid price per click to determine the effective CPM ("eCPM") rate for each ad, and then choose the highest eCPM ads. Or combining with purchase or other conversion data to establish a cost per action ("CPA"), and then include CPA values among the selection process. In either case the ad selection formula typically relies on an auction-based marketplace. The term eCPM is an industry standard known to persons of ordinary skill in the art. As is readily understood by a person of ordinary skill in the art, CPA is also known as cost-per-conversion, or cost-per-sale.

The eCPM value reflects what the equivalent CPM is if the pricing model is based on CPC or some other non-CPM model. For example, a CPC rate multiplied by the ad's click-through-rate multiplied by 1000 yields the eCPM for that ad based on its response.

$$eCPM = CPC * CTR * 1,000;$$

or $$eCPM = \frac{Cost}{Click} * \frac{Click}{Impression} \times 1,000$$

Auctions provide a means for extracting appropriate market value for ad space, but they also create problems. For example, when advertisers purchase a fixed CPM or CPC campaign to distribute their ads with a publisher or media company, they know that they will get that distribution or otherwise there was an issue with the vendor. In an auction marketplace the advertiser does not have the same clear contract with the publisher, since other advertisers may outbid them for the distribution at any time. As an example, if the advertiser wants to run a campaign that generates 30,000 clicks in a month within a budget of $15,000, then they might bid a maximum CPC of $0.50 per click, they might start off getting the 1000 clicks per day that they want, then a few days later suddenly drop to 100 or 0 clicks per day when their ad is preempted by a higher paying advertiser. At that point they have to adjust their bid to a higher per click rate to restart the campaign (risking exceeding the original advertising budget), or move the campaign to another publisher, etc.

As such, fixed price models are good for advertiser predictability but bad for publishers and networks looking to maximize the value of dynamic properties. Auction models are good for publishers and networks' ability to maximize value, but bad for advertiser predictability. Advertisers generally prefer to pay based on a CPC rate, thus assuring they pay only when users show interest in their ad and generate a response. Inapposite, publishers like to be paid on a CPM basis, thus providing a more predictable return—publishers know how much traffic they get to their site (how many pages they serve to their users per-day or per-month); so on a CPM basis they can predict revenue independent of an advertising campaign performance.

Furthermore, the ad traffic generated by users visiting publishers' sites can be anywhere from a very low value to a very high value for advertising. Even within a single publisher the value of traffic generated often has a range of value to advertisers. However, without an ability to classify that traffic into different groups that separate the higher from the lower value traffic, publishers typically must strike simplistic CPM deals with the networks that deliver advertisements. These deals provide publishers with a flat CPM rate that does not give publishers upside on their higher value traffic.

Further, missing from the art are methods and systems for placement of internet advertisements or services that provide publishers an upside value on their higher value traffic, and provide publishers with a more predictable return. The present invention can satisfy one or more of these and other needs.

SUMMARY OF THE INVENTION

The present invention relates to a method for pricing and ranking ads in an inventory of ads that achieves both predictable delivery for advertisers and maximized property value for publishers and networks.

In accordance with one aspect of the invention, a system sets ad prices to be variable based on ad performance. This internet-based system for pricing advertisements, comprises an Internet property, operated by a publisher, that contains at least one page capable of displaying advertisements. Advertisement performance metrics to classify Internet ad traffic into performance groups that are associated with a minimum profitable eCPM amount. A rule base associates particular ads in an advertisement inventory to at least one ad traffic classification performance group, and further associates each of the particular ads with a minimum price and a maximum price. An ad server receives a request to deliver an ad, and consults with a classification system to determine the performance group corresponding to parameters of the ad request. The rule base is applied to the advertisement inventory associated with that performance group so as to select one or more associated advertisements, and deliver the one or more advertisements for display on the Internet property page. A historical statistics repository Includes the historical performance of each advertisement in the inventory associated with an ad traffic classification. A pricing and optimization engine applies these historical statistics to establish the current performance of each ad in each performance group, compares the current performance to an expected performance, establishes a new price between the minimum price and the maximum price.

In accordance with another aspect of the invention, an Open Purchase Order ad server maintains the profitability of the publisher and network even when a publisher's agreed CPM or eCPM rates cannot be delivered by the network.

These and other aspects, features, steps and advantages can be further appreciated from the accompanying figures and description of certain illustrative embodiments.

BRIEF DESCRIPTION OF THE DRAWING FIGURES

FIG. 1 is a flow diagram illustrating steps in accordance with an embodiment of the invention;

FIG. 2 diagrams a conventional workflow among a publisher, an ad server, and an ad inventory to deliver an ad to a user;

FIG. 8 is an exemplary GUI for interaction with a publisher to create a new tag on an OPO Network;

FIG. 9 is an exemplary GUI for interaction with a publisher to set their price for a new tag on an OPO Network;

FIGS. 10 and 11 are exemplary GUIs for interaction with a publisher to register their passback tag on an OPO Network;

Figure 13:
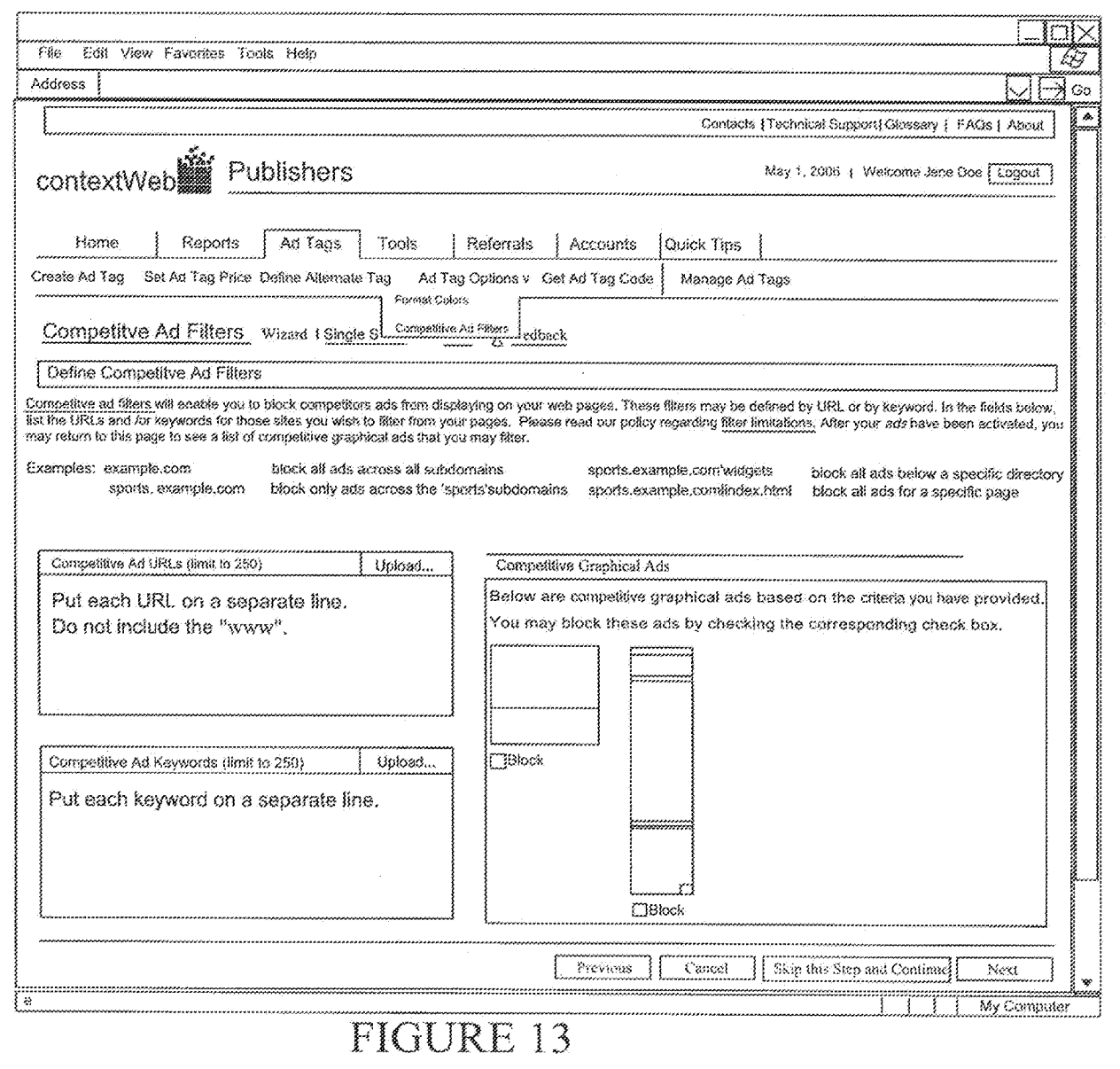

FIG. 13 an exemplary GUI for interaction with a publisher on an OPO Network to setup additional business rules;

Figure 14:
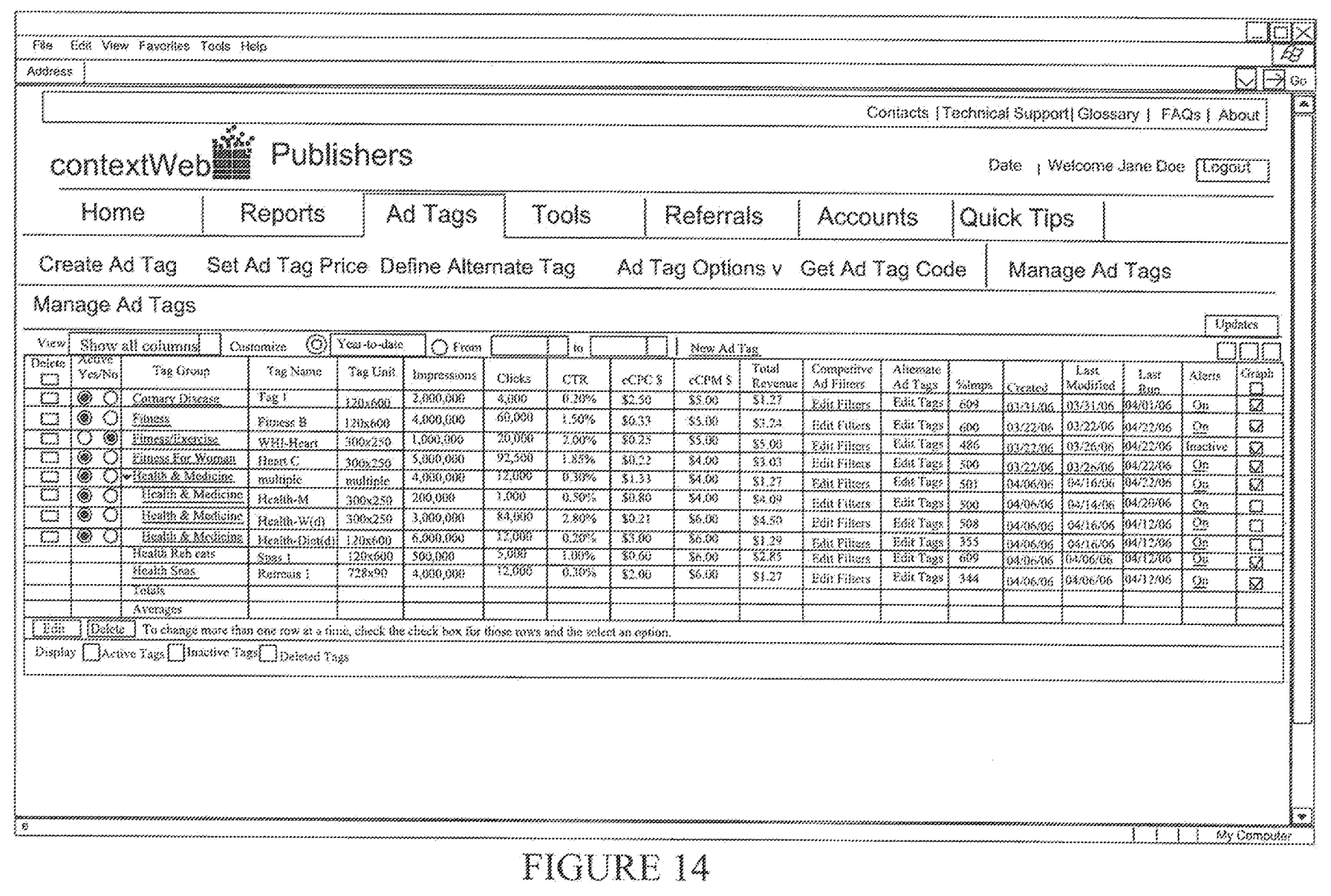

FIG. 14 is an exemplary GUI for interaction with a publisher to view and manage the performance of their ad tags across different performance groups; and FIG. 15 is an exemplary GUI for interaction with a publisher to view and manage an advertiser and publisher referrals system in place on an OPO Network.

DETAILED DESCRIPTION OF THE ILLUSTRATIVE EMBODIMENTS

By way of overview and introduction, presented and described are embodiments of a method and system that prices and ranks ads in an inventory of ads. Different embodiments interrelate at least the following elements:

1. One or more internet publishers or properties that contain pages where ads may be shown
2. An inventory of ads available to be shown on those properties
3. A rule base that may be used to match particular ads in the inventory to particular classifications of ad traffic
4. A classification system that may be applied to a set of properties or pages
5. A set of prices that correspond to each class in the classification system The term "ad traffic" has the meaning of a real time series of requests for ads or ad impressions generated by end-viewers of advertisements from their Web browsers, or other Internet content access device.

Figure 1:
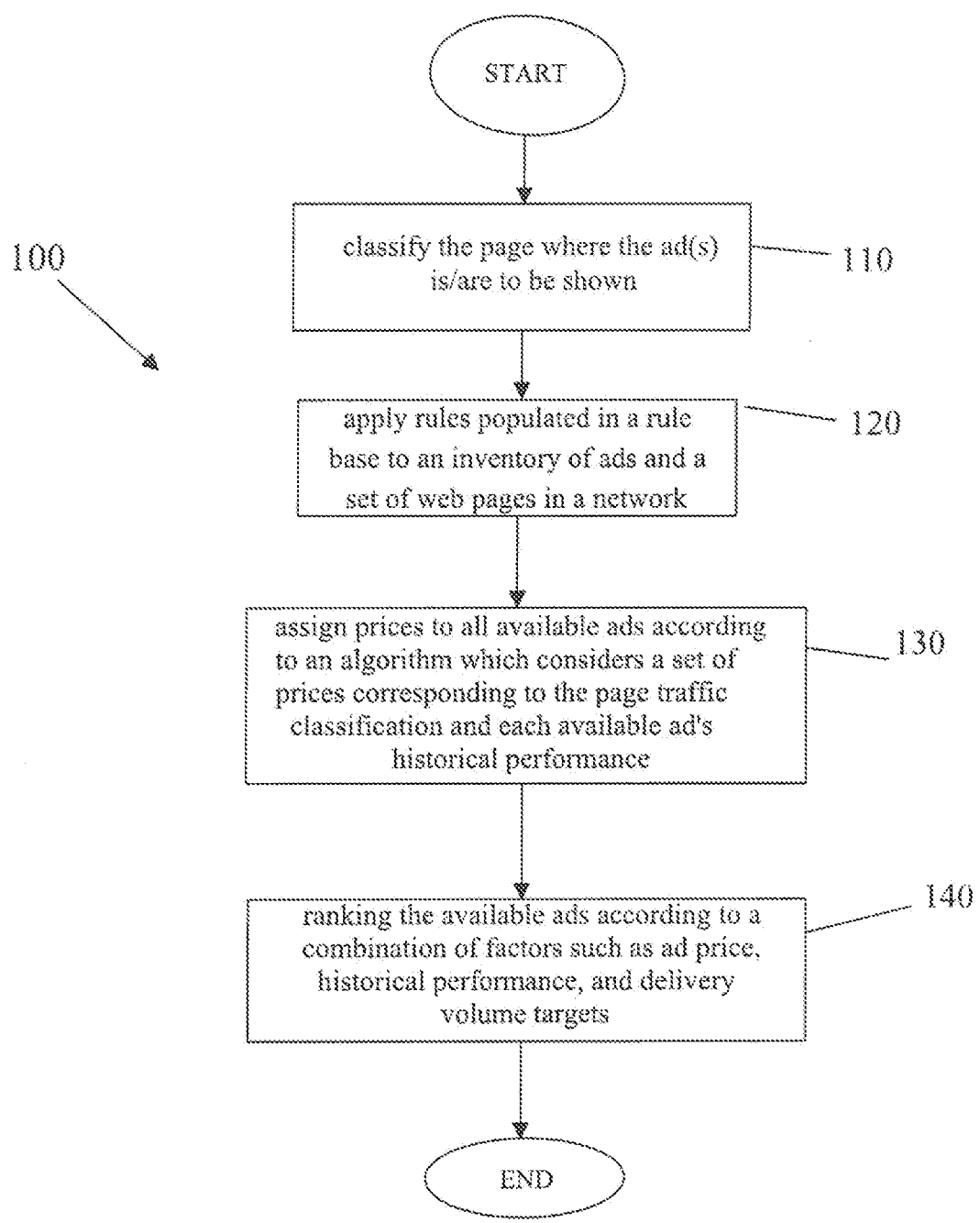

With reference to FIG. 1, process 100 embodies the classification system. Process 100, at step 110, classifies by the topical category of the page (e.g., by the page content). For example if the content of the page generally discusses baseball then baseball can be its category. However, the classification system is not so limited, and other methods and approaches to classifying the category of the page are within the scope of the invention. These other classifications can include, but are not limited to, combinations of the page address or Internet domain name, the dimensions of the ad space to be filled, the type of ad media the publisher has allowed to fill the ad space, the time of day, day of week, or other time-based criteria, the geographical information about the end-viewer's location or web server's location, and user demographic data. It is also specifically noted that the classification system does not require any user-based data or user demographic data in order to achieve valuable classification of traffic, although as mentioned this data can also be included according to the discretion of the parties involved.

The rule base contains rules that match each ad in the inventory to a classification of the ad traffic such as a contextual category of the current page determined by a real-time contextualization process. In other embodiments these rules match ads to keywords, or to a combination of categories and keywords, or match ads to other features, and combination of features, as mentioned earlier regarding traffic classification methods. The set of prices contains a minimum CPC price for each category in the classification system. The network and ad server use a CPC pricing model for ads.

At step 130, the ad server prices the same ad differently according to the category of the page. This results from the ad server running an algorithm embodying the invention which ensures that the CPC assigned by the ad server to each ad delivered to the page is above the minimum CPC for that page's category. In a further embodiment, the ad server also tracks the historical performance, step 140, of that particular ad when placed on pages within the same category of page, to better ensure a profitable eCPM. If the ad is getting a lower than expected CTR then the ad server increases the CPC for that ad in that category, therefore raising the eCPM.

Advertisers are able to manage their customer acquisition budget by specifying a maximum price that they are willing to pay per click for either a particular ad, or for that particular ad when delivered/placed on a particular category of page. The ad server, through the algorithm, increases the CPC for that ad only up to the maximum specified value, and then pre-empts the ad from being shown in that category if the eCPM is still below the target for that category. An incremental increase of the CPC can be specified by the advertiser, and the ad server continues to monitor the ad performance. The CPC for the ad can then be raised in incremental steps if the CTR remains non-competitive for that category of page. As long as the CPC price set by the ad server is greater than the established minimum price per category, and that the price is not more than the maximum CPC price specified by the advertiser, then that ad remains placed.

This process through the algorithm achieves:

1. Ad pricing that changes according to the classification of the ad traffic in which the ad is shown
2. Ad pricing that changes according to the historical performance of that ad in terms of its rate for generating positive user response such as clicks or sales.
3. Automatic removal of ads that do not meet both the advertiser's budget and the publisher's and/or network's market value for its pages.

Other embodiments are within the scope of this description and include, but are not limited to, the following embodiments.

An embodiment where the classification system classifies by website, publisher "account" on the ad server, and/or by "publisher domain" (e.g., all *.yahoo.com pages may be classified under the yahoo.com publisher domain). This embodiment allows minimum prices to be set on a per-publisher basis, separately or in conjunction with the page classifications. In a further embodiment, a minimum price per-ad format is set on a per publisher basis. Here the different "ad formats" are different formats for presenting the same ad content, e.g., different sizes and orientations. Further, the rate may be set per-area of the page, e.g., top, bottom, and so forth.

In another embodiment, the classification system can classify on a time basis—e.g., time of day, day of week, month, holidays, and so forth. Classification parameters can further include user-based information such as recent pages viewed or user demographic classifications. However, these user-based classifications are not necessary for the operation of the present invention.

A minimum price and expected ad performance in one or more classes of ad traffic are established by an advertising network in a manner where that prices are known to be profitable for both the publisher and the network. A maximum price for the ad in each class of traffic is established by the advertiser, such that the ad campaign is also affordable to the advertiser. The actual price charged to the advertiser is revised by the network on a regular basis according to the ad's performance, where the actual price remains within a range between the minimum price and a maximum prices. Thus, publisher profitability and advertiser affordability are assured. The ad is pre-empted only for underperformance on its own merits, e.g., there is no possible price meeting the requirements of the publisher, the advertiser, and the network.

In another embodiment, a method maintains the publisher's and network's profitability even when the agreed upon publisher's CPM and/or eCPM rates cannot be delivered by the network. In accordance with this method, a network called an Open Purchase Order Network ("OPO" Network) negotiates a CPM rate with the publisher that is higher than the CPM rate the publisher is currently paid for their traffic by another network. The OPO Network classifies the publisher's traffic into higher and lower value traffic for advertising, delivers the ads to the publisher, and pays the agreed higher CPM for the higher value traffic. The OPO Network also passes back to the publisher that portion of traffic for which the network cannot profitably pay the agreed CPM. The publisher then in turn gives that passed back traffic from the OPO Network to a conventional network that pays the publisher the previously agreed lower CPM rate. According to this method the publisher increases its revenue without risk, and the OPO Network gets the first right of refusal on all traffic sent by the publisher, which previously went directly to the conventional ad network.

In another embodiment the classification system extends beyond page classification to include broader "ad traffic" classification. "Ad traffic" is actual real time series of requests for ads generated by users (end-viewers of ads) from their Web browsers or other Internet content access device. Where navigation information from users generates pages through static criteria, ad traffic develops a dynamic criteria which combines page identification with user based classification and time factors (e.g., time of day, day of week, date range, holidays). Ad traffic also can account for the quantity of unique users getting the ad. The number of times a user has had an ad delivered is monitored, and the ad can be stopped to prevent repetitive placement of the ad to a user—this is commonly known as frequency capping. Thus, ad traffic criteria can include user-based classifications such as geographic location, user demographics, and the number of times that user has an ad delivered by the present invention in the last day or other period of time. It could also include time of day or day of week classifications.

A further embodiment of the invention is a method that selects from an inventory of services not typically classified as advertisements. For example, these services could be types of syndicated web content, or affiliate links used in affiliate marketing. The fees for placing the services on a page are then determined by the processes described above.

Another embodiment where a CPM "media buy" may be used to hedge the performance of a CPC media buy. In this embodiment the pricing and placement algorithms described above are used to place ads from the CPC inventory when such inventory is available. When CPC inventory is not available then ads can be shown from the fixed-price CPM inventory. This results in a combination of the CPC and CPM pricing models so as to partition space for different ads based on an above/below price level or based on the available ad inventory.

Figure 2:
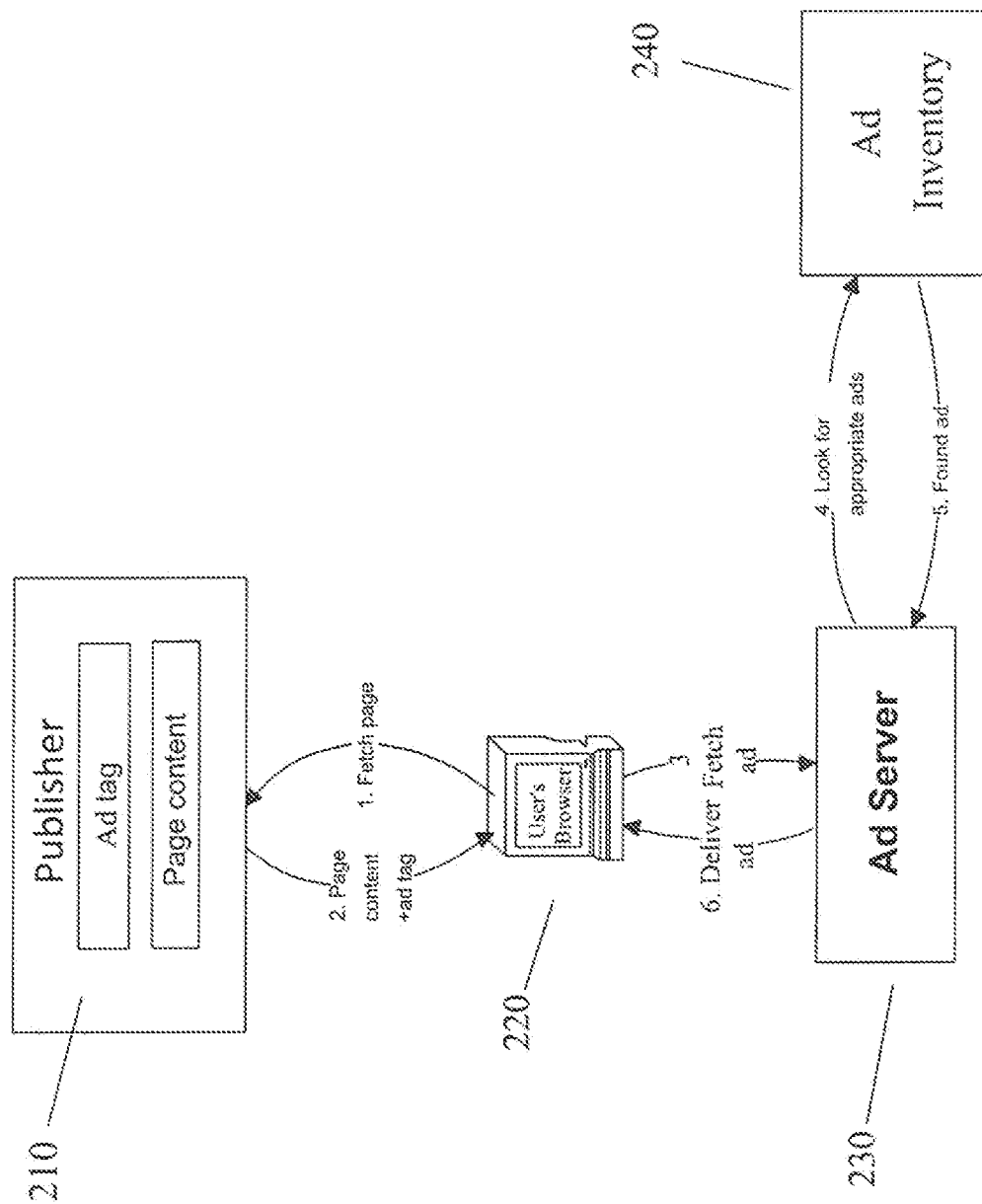

FIG. 2 diagrams a conventional process for delivering ads to a user operating a Web browser. The user uses his browser 220 to fetch a Web page from a publisher site 210. The publisher site delivers the page content containing space for an ad, plus an ad tag. That ad tag is a small piece of software (typically javascript) executable by the web browser 220. The browser executes the tag, automatically causing the browser to generate a request for ad content from the ad server 230. The ad server looks in the ad inventory 240 for available ads to deliver, selects one and delivers it back to the user's browser which displays it together with the publisher's page content.

Figure 3:
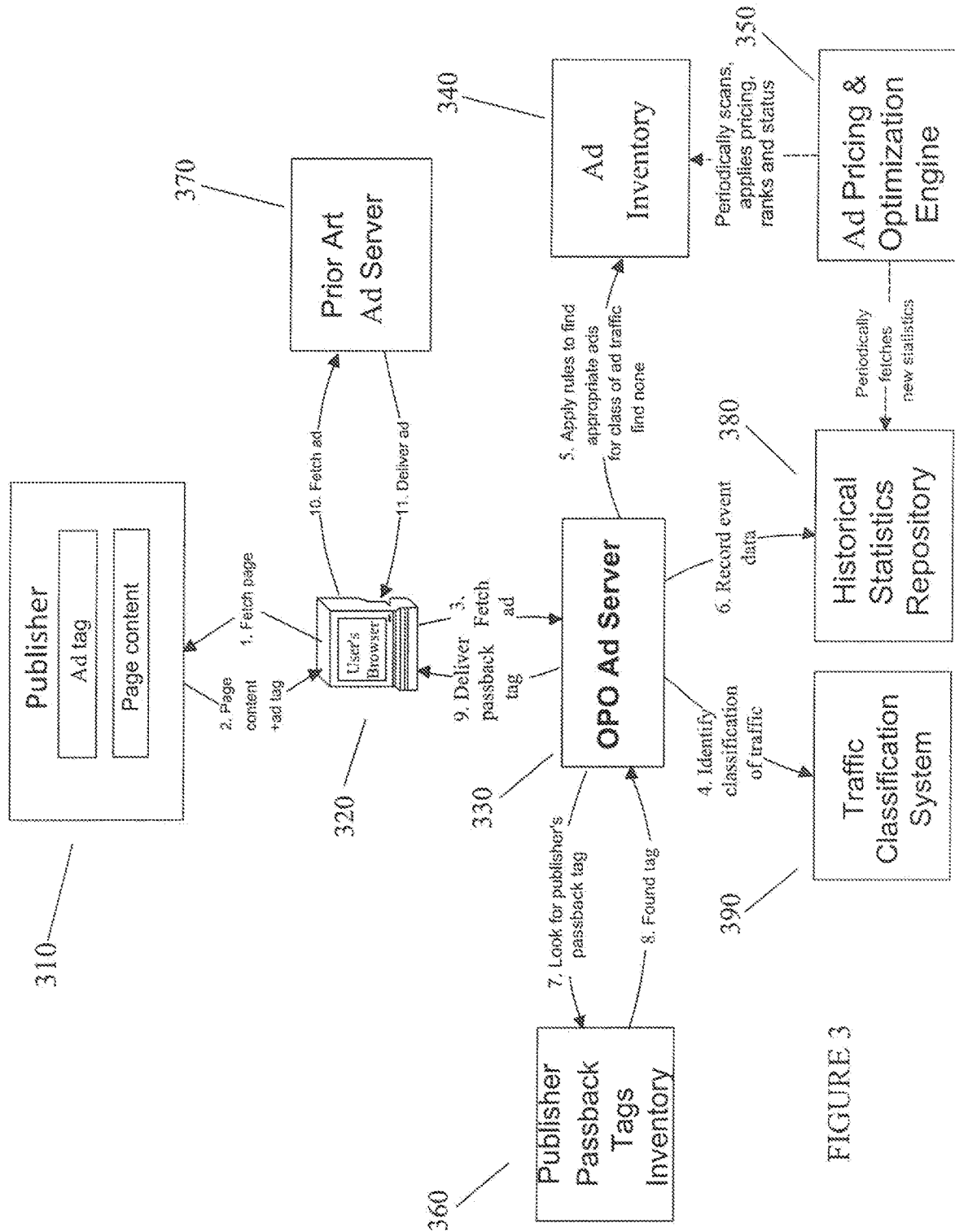
FIG. 3 illustrates a workflow delivering an ad to a user after a tag passback from an OPO Network's ad server in accordance with an embodiment of the present invention.

FIG. 3 illustrates a workflow to deliver an ad to a user in accordance with an embodiment of the present invention. FIG. 3 depicts the case where when the browser 320 executes the ad tag, a call is generated to an OPO Ad Server 330. The OPO Ad Server consults the traffic classification system 390 in order to classify the act request into a performance group. The OPO Ad Server then applies matching rules to find available ads for that class or performance group from the ad inventory 340. In the scenario shown in FIG. 3 no suitable ads are found. Data about the ad request is stored in the historical statistics repository 380 for later processing. The OPO Ad Server then looks for and finds a passback tag in the Publisher Passback Tags Inventory 360 (the publisher having previously registered that passback tag in that inventory). The OPO Ad Server delivers that passback tag to the user's browser 320, the browser automatically executes that tag causing a subsequent request to be immediately made to fetch the ad from a standard ad server 370. In order for the OPO Ad Server to be able to make optimized ad selections, an ad pricing and optimization engine 350 periodically fetches recent statistics about served ads from the historical statistics repository 380 and applies those statistics with the pricing rules (choosing between a minimum price and a maximum price) to the ads in the ad inventory to update current ad pricing and activation status in each performance group.

Figure 4:
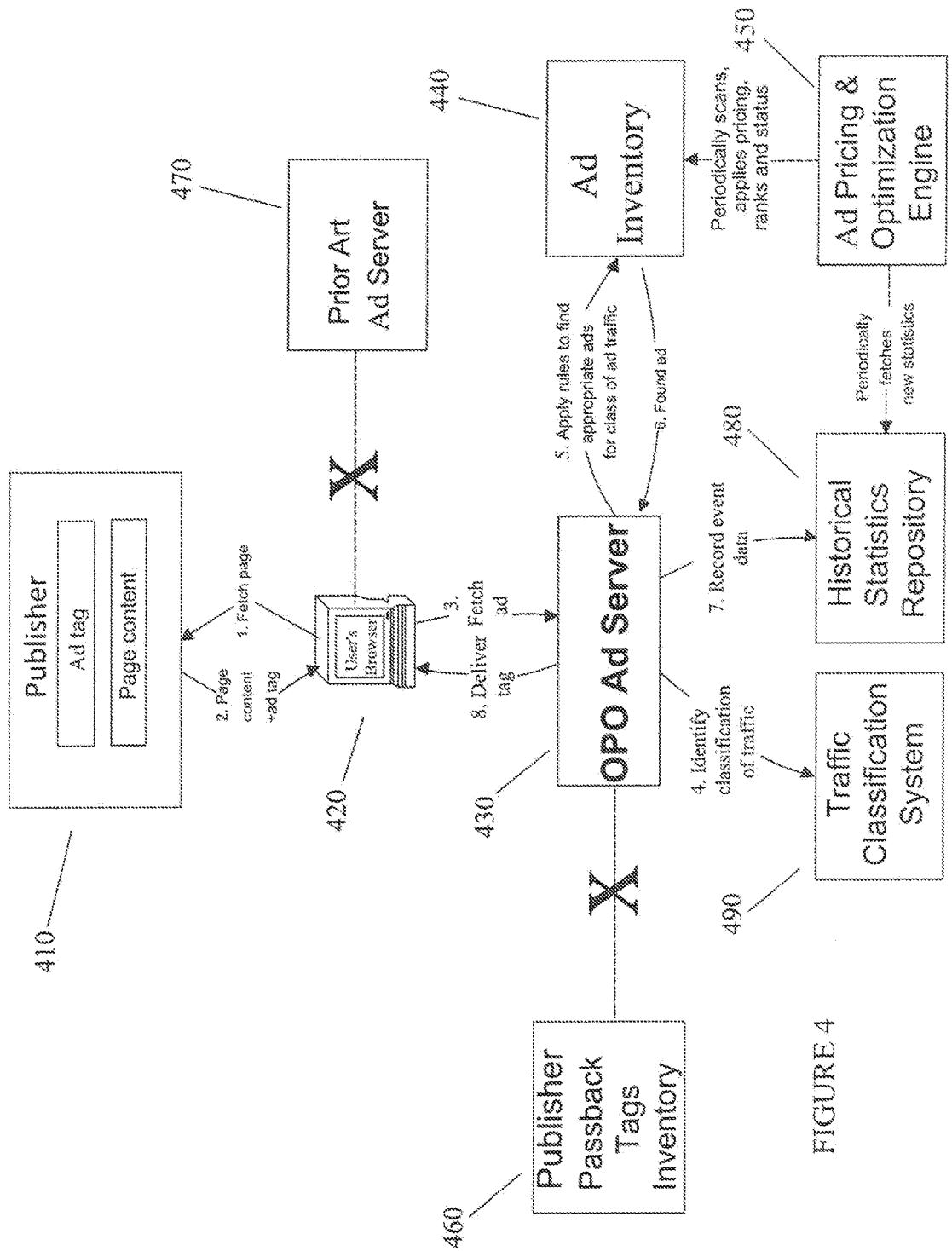
FIG. 4 illustrates a workflow delivering an ad to a user by an OPO Network's as server in accordance with an embodiment of the present invention.
Figure 5:
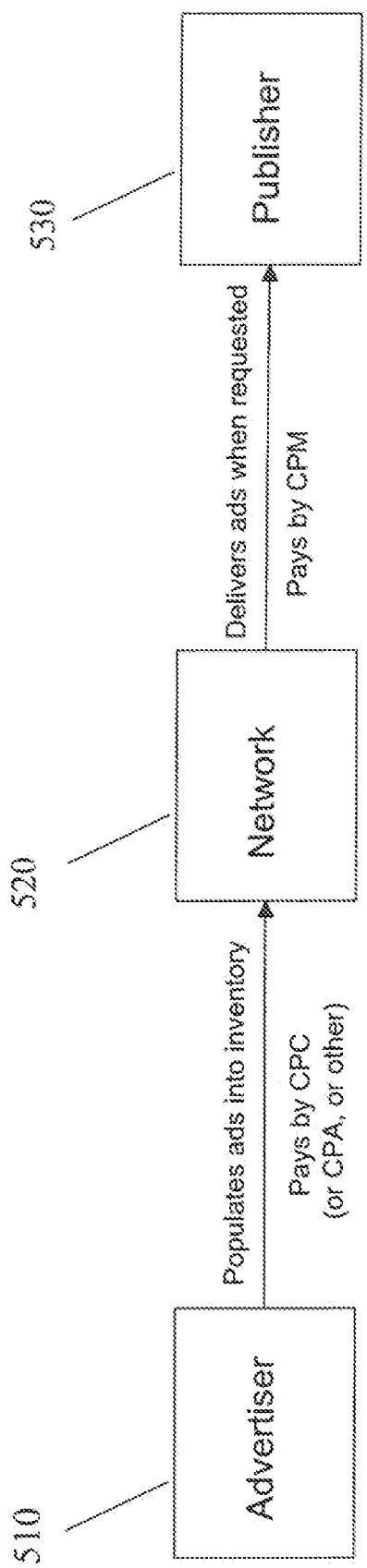
FIG. 5 depicts the high level business relationships and interactions among an advertiser, a publisher, and a network in accordance with an embodiment of the present invention.

FIG. 4 is a further embodiment of the present invention illustrating the delivery of an ad to a user by an OPO network server. In this embodiment the OPO Ad Server 430 finds an appropriate ad for the performance group from the Ad Inventory 440. Data about the ad request is recorded in the historical statistics repository 380, this data includes information sufficient for measuring each advertisement's performance. For example, to measuring click-through rate the data includes a record that the chosen ad was delivered, and later records that the ad was clicked. Depending on the implemented classification system the data logged can also include time of day, geographic location, etc. The ad is then delivered directly to the user browser 420. No passback tag is required in this case, and the prior art ad server is also not required. The publisher is paid the higher of the CPM or eCPM amount (not shown) due to the OPO Ad Server finding a matching paid ad to show for the determined performance group of the ad request.

Figure 6A:
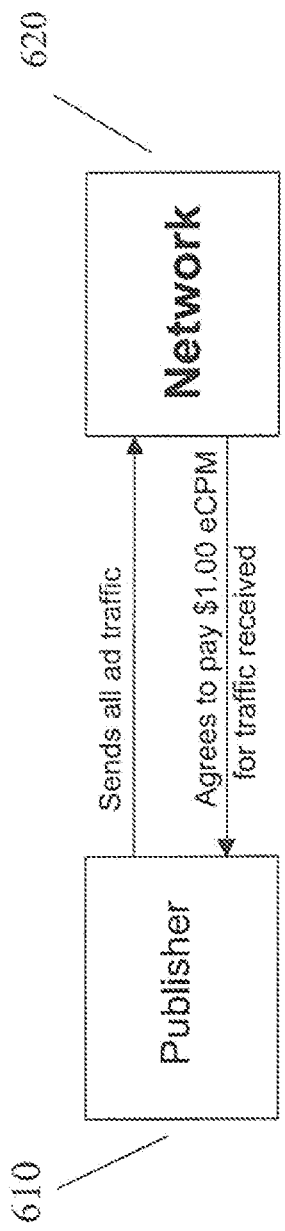
FIG. 6A depicts a conventional relationship between a publisher and a network.
Figure 6B:
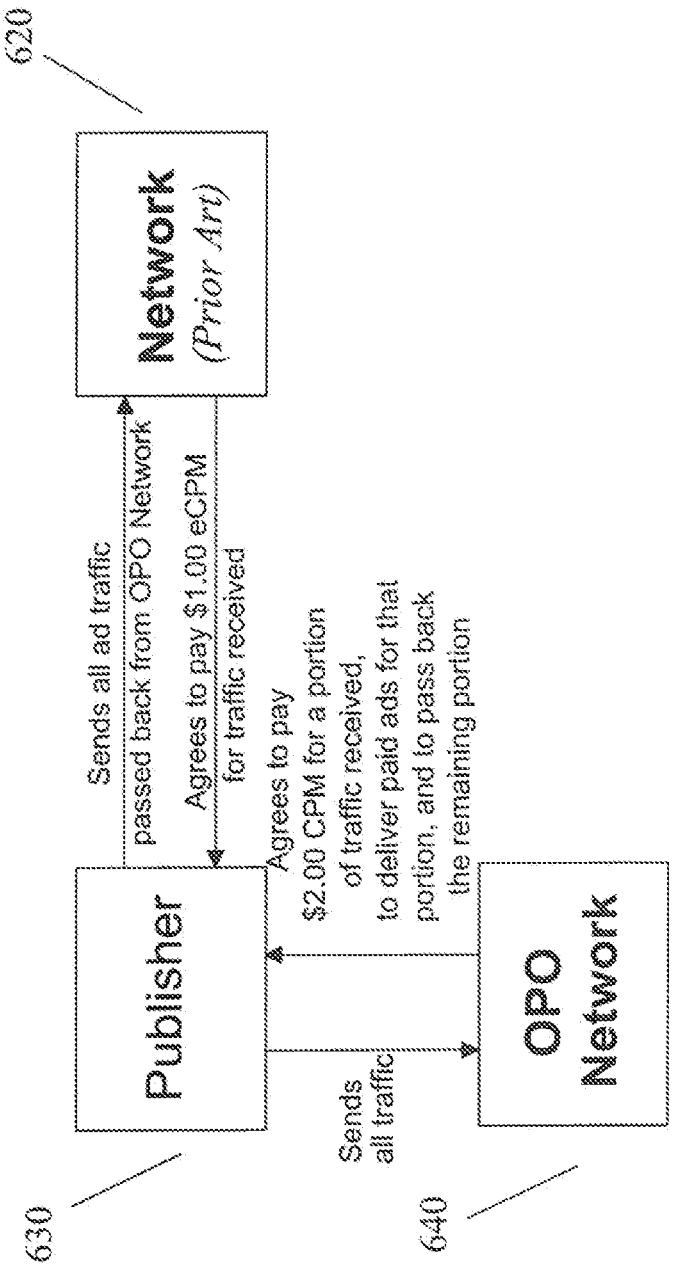
FIG. 6B depicts the relationship between a publisher, an OPO Network, and a conventional network in accordance with the present invention.

FIGS. 6A and 6B together illustrate the difference between a publisher's business relationship with ad networks under the prior art (FIG. 6A) and under an embodiment of the current invention (FIG. 6B).

FIG. 6A depicts the conventional where the publisher 610 agrees to send all its ad traffic to a particular ad network 620, and where the ad network is granted the right to deliver its ads into that traffic (i.e., deliver its ads in response to ad requests generated by that publisher's page views). In exchange the network pays the publisher an agreed rate. By way of example, the rate shown is $1.00 eCPM, and it is understood that in real terms the agreement between the publisher and the network might be to pay on a CPC or CPA basis or on a revenue share basis, but it is imagined that those fees generally work out to a $1.00 eCPM rate paid to that publisher.

FIG. 6B depicts the relationship between a publisher, an OPO network, and a conventional network in accordance with an embodiment of the present invention. The publisher 630 sends its ad traffic to the OPO Network 640. The OPO Network employs an OPO Ad Server to examine the traffic in real time, and classify it into performance groups. For that portion of traffic for which the OPO Network has an appropriate paid ad in its inventory, it delivers that ad and pays the publisher at the agreed higher (e.g., $2.00 CPM rate) for that traffic. For that portion of traffic for which the OPO Network does not have paid ads to show, it instead passes the ad request back to the publisher.

The OPO Network owes the publisher nothing for that transaction. But, the publisher is able to forward that ad request immediately to the prior art network 650 that is able to pay the publisher the same (e.g., $1.00) baseline eCPM. As a result the publisher is able to generate higher revenues from the same ad traffic without any increased risk, and the OPO Network has a right of first refusal on all traffic, keeping that portion which is of highest value and passing back the rest.

Figure 7:
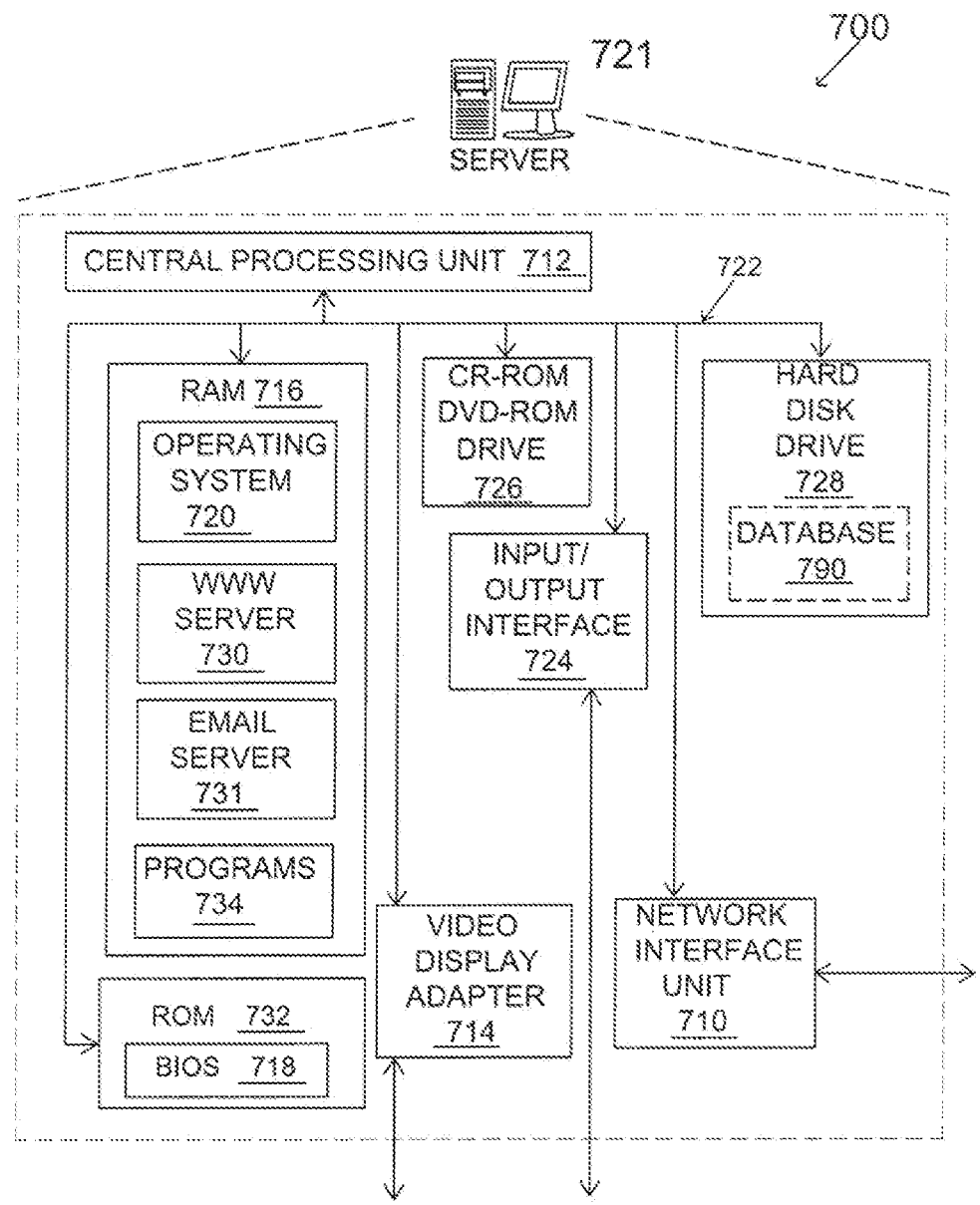
FIG. 7 depicts components of an exemplary environment in which processes embodying the invention can be implemented.

FIG. 7 depicts components of an exemplary environment in which processes embodying the invention can be implemented. Not all the components are required to practice the invention, and variations in the arrangement and type of the components may be made without departing from the spirit or scope of the invention. The particular component configuration is not critical to the present invention.

The server shown in FIG. 7 is connected to a communication network that can be a local area network ("LAN"), a wide area network ("WAN"), the Internet, or a combination of all three interconnected by routers (not shown). A router is a intermediary communications network device that links many computers through a mesh of possible connections, a router receives transmitted messages and forwards them to their correct destinations over available routes. On an interconnected set of networks—including those based on differing architectures and protocols—a router acts as a link between the networks, enabling messages to be sent from one to another. The communication links within a network typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links such as WiFi, WIMAX, GPRS, CDMA, TDMA, TSM, hybrids of the foregoing or future technologies, or other communications links known to those skilled in the art. Communication to the communication network is preferably by an interface unit associated with a client computer (not shown), the interface unit can be a remote computer (not shown).

Furthermore, computers, and other electronic devices can be remotely connected to the communication network via a modem and temporary telephone link. The number of WANs, LANs, and routers may be increased or decreased arbitrarily and is independent of the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use Transmission Control Protocol/Internet Protocol ("TCP/IP") and other packet based protocols to communicate with one another. An embodiment of the invention may be practiced over the Internet without departing from the spirit or scope of the invention. Processes embodying the invention also may be practiced m a peer-to-peer or grid computing architecture, without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any Information delivery media. The term "modulated data signal" means a signal that has one or more of its characteristics set or changed in such a manner as to encode information in the signal. By way of example, communication media includes wired media such as twisted pair, coaxial cable, fiber optics, wave guides and other wired media, and wireless media such as acoustic, RF, infrared and other wireless media.

FIG. 7 depicts an exemplary server 721. Server 720 may operate to provide a World Wide Web site (web site), and an email system or a short message service (SMS) system, a multimedia system (MMS) for sending text and images or video in a single message, an instant messenger, and/or other message systems, among other things. When providing a web site, server 221 receives a request from a browser application of a different device in the network, and in response transmits back data configured as pages. For instance, server 721 communicates pages to the user with advertisements placed within the page according to the embodiments of the invention described above.

Those of ordinary skill in the art will appreciate that the server 721 may include many components which are not shown in FIG. 7. However, FIG. 7 shows enough components sufficient to disclose an illustrative environment for practicing embodiments of the present invention. Server 721 is connected to the communications network via a network interface unit Those of ordinary skill in the art will appreciate that the network interface unit includes the necessary circuitry for connecting server 721 to the communication network, and is constructed for use with various communication protocols such as the TCP/IP protocol. Typically, the network interface unit is a card contained within server 721.

Server 721 also can include a central processing unit, a video display adapter, and a mass memory, all connected via a bus. The mass memory generally includes random access memory ("RAM"), read-only memory ("ROM"), and one or more permanent mass storage devices, e.g., a hard disk drive, a tape drive, an optical drive, and/or a floppy disk drive. The mass memory stores an operating system that controls the operation of server 721. A basic input/output system ("BIOS") is also provided for controlling the low-level operation of server 721. The hard disk-drive is utilized by server 721 to store, among other things, application programs, databases, and program data. Among the programs and databases stored in server 721 is the algorithm, base-rules, classifications, and advertisement performance criteria metrics discussed above for embodiments of the invention. The programs can be stored in memory such as RAM 716, ROM 732, or on CR-ROM 726. The databases can be stored on disk drive 728, in database 790, or in another data store as is known in the art.

The mass memory may include volatile and nonvolatile, removable and non-removable media, which can implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a web site. More specifically, the mass memory may store applications, including but not limited to: a WWW server application, email server application, and programs. WWW server application includes computer executable instructions which, when executed by server 721, generate browser displays, including performing the logic described above. Server 721 may include a JAVA virtual machine, an SMTP handler application for transmitting and receiving email, an HTTP handler application for receiving and handing HTTP requests, and an HTTPS handler application for handling secure connections. The HTTPS handler application may also be used for communication with an external security application to send and receive sensitive information, such as email, in a secure fashion.

Server 721 also comprises an input/output interface for communicating with external devices, such as a mouse, keyboard, scanner, or other input devices not shown in FIG. 7. The server also supports text-to-voice conversion, voice-to-text conversion, or both, for communicating with a wide variety of client machines and permitting requests to the system and outputs of scores and ratings and other information from the system to be conveyed aurally and free of the need for a visual interface.

Data may be stored in a data store, such as, for example, database 730, to which server 721 has access. Access to database 730 can also be made available to client computer 710, or any computer connected to the communication network. Database 730 can be a one or a combination of any of the mass storage technologies discussed above, as is known by a person of skill in the art.

Those of ordinary skill in the art will appreciate that client computer may include many more components than those described above. However, it is not necessary that those generally-conventional components be shown in order to disclose an illustrative environment for practicing embodiments of the present invention.

Client computer includes a central processing unit (CPU), a video display adapter, and memory. The memory generally includes RAM, ROM, and a permanent mass storage device, such as a disk drive. The memory stores an operating system, a BIOS, and programs for controlling the operation of the client computer. The memory can also be loaded with client software specific to practicing embodiments of the present invention. It will be appreciated that these components may be stored on a computer-readable medium and loaded into memory of client computer 210 using a drive mechanism associated with the computer-readable medium, such as a floppy disk drive, an optical drive, such as a CD-ROM/DVD-ROM drive, and/or a hard disk drive. An input/output interface can also be provided for receiving input from a mouse, keyboard, or other input device. The memory, network interface unit, video display adapter, and input/output interface are all connected to the processing unit via a bus. Other peripherals may also be connected to the processing unit in a similar manner. For example, the interface may also be provided at a terminal, for displaying accessed data, computed scores, and so on.

It should be understood that the client machine could be embodied as any one of a great variety of electronic devices ranging from general purpose computing machines such as workstations, desktop, laptop and notebook computers, thin clients, and terminals to less general devices such as personal digital assistants (PDAs) or smart phones, to a special purpose devices such as DVB-H enabled mobile devices. Regardless of the physical form of the client computer, it includes a local memory, a processor, and input/output capabilities to permit interaction with a user.

Figure 8:
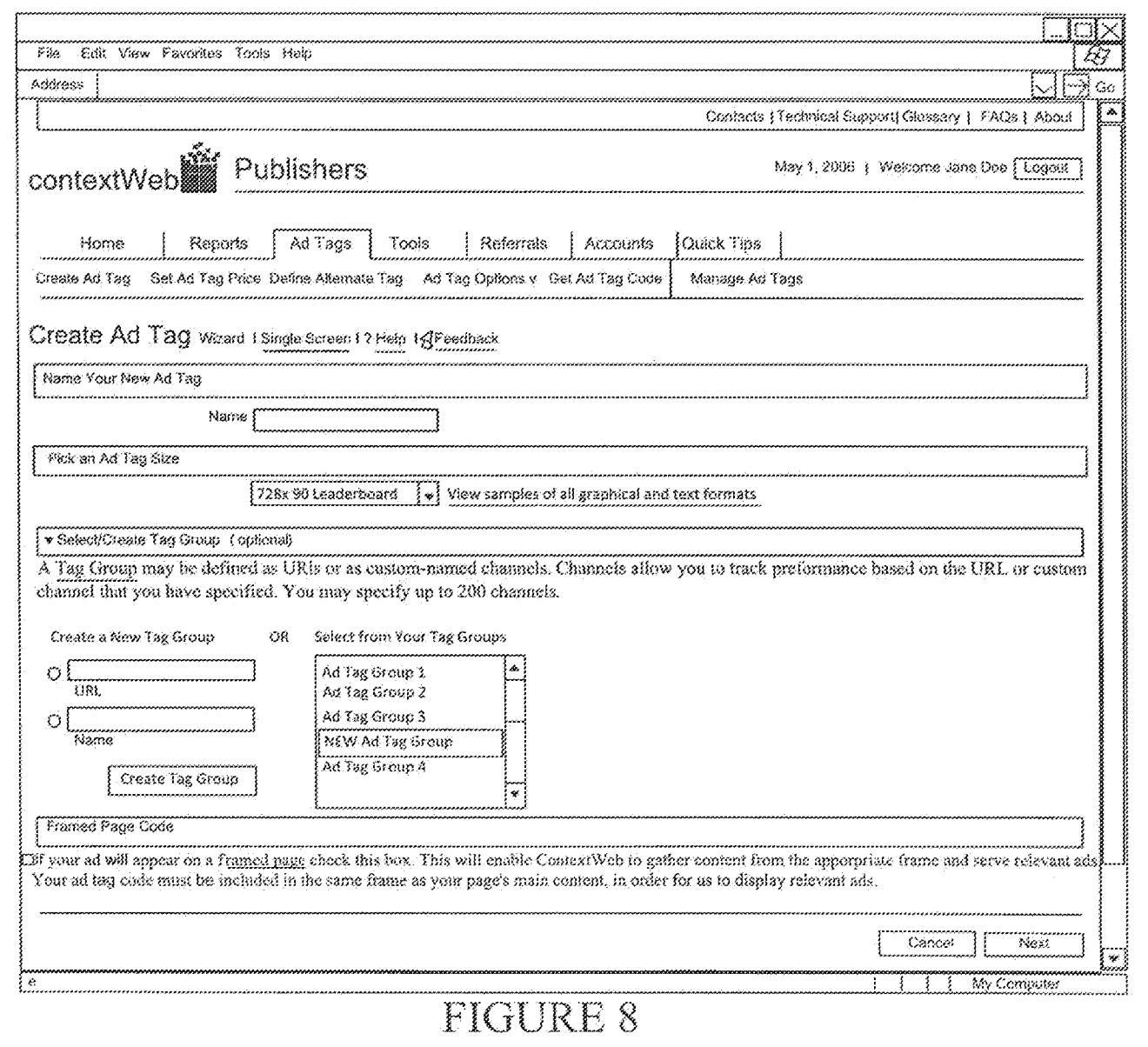

FIG. 8 is an exemplary GUI user interface that a publisher can use to create a new tag on an OPO Network. The GUI accepts a name for the new tag, the tag size, and assign the tag to a group for organization.

Figure 9:
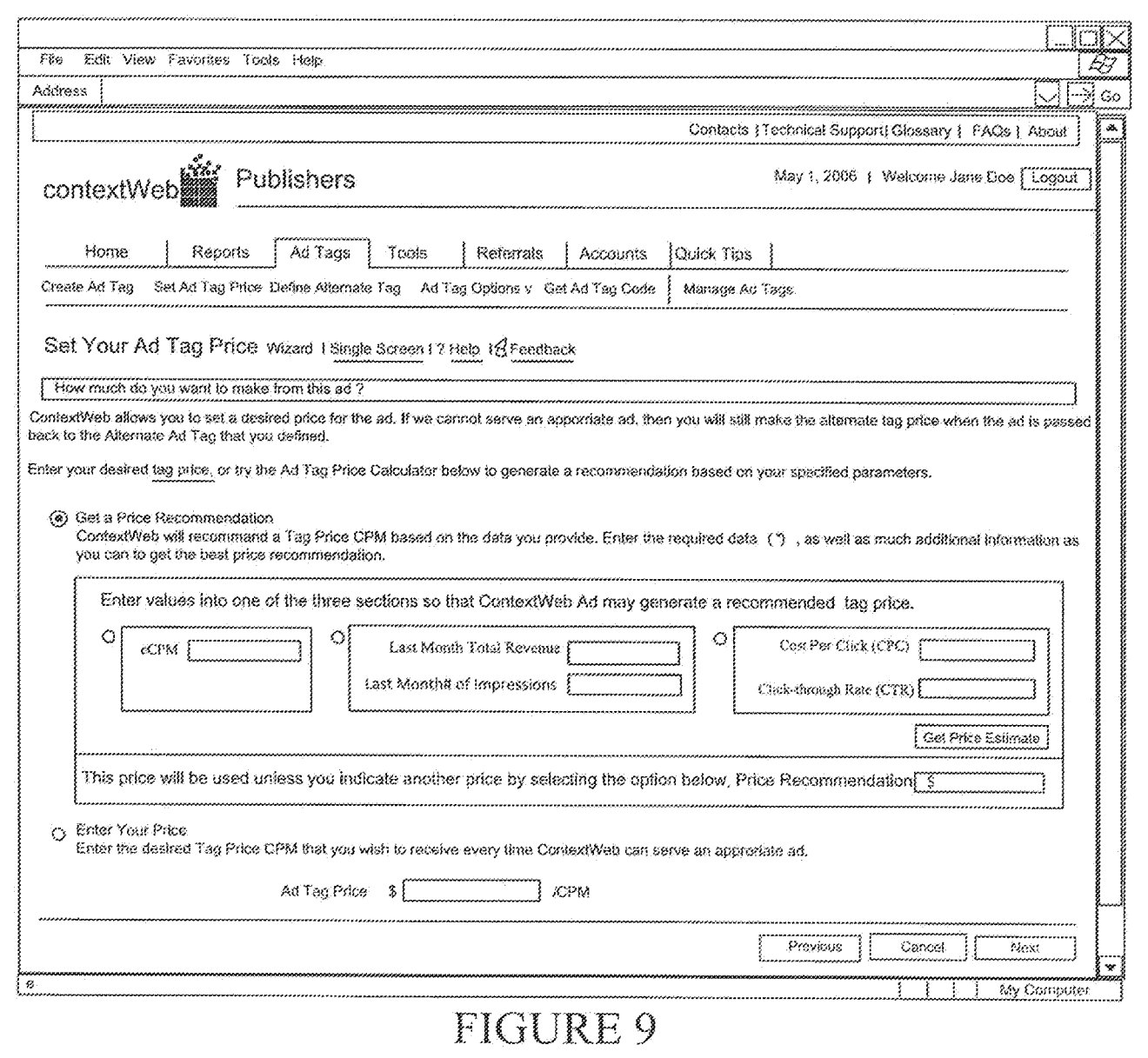

FIG. 9 is an exemplary GUI user Interface that a publisher can use to set their price for a new tag on an OPO Network. This GUI is used in conjunction with one embodiment of an OPO Network for establishing the minimum CPM or eCPM price for ads within a performance group. In this instance, the publisher sets the minimum price himself, empowering him to manage his own economics.

Figure 10:
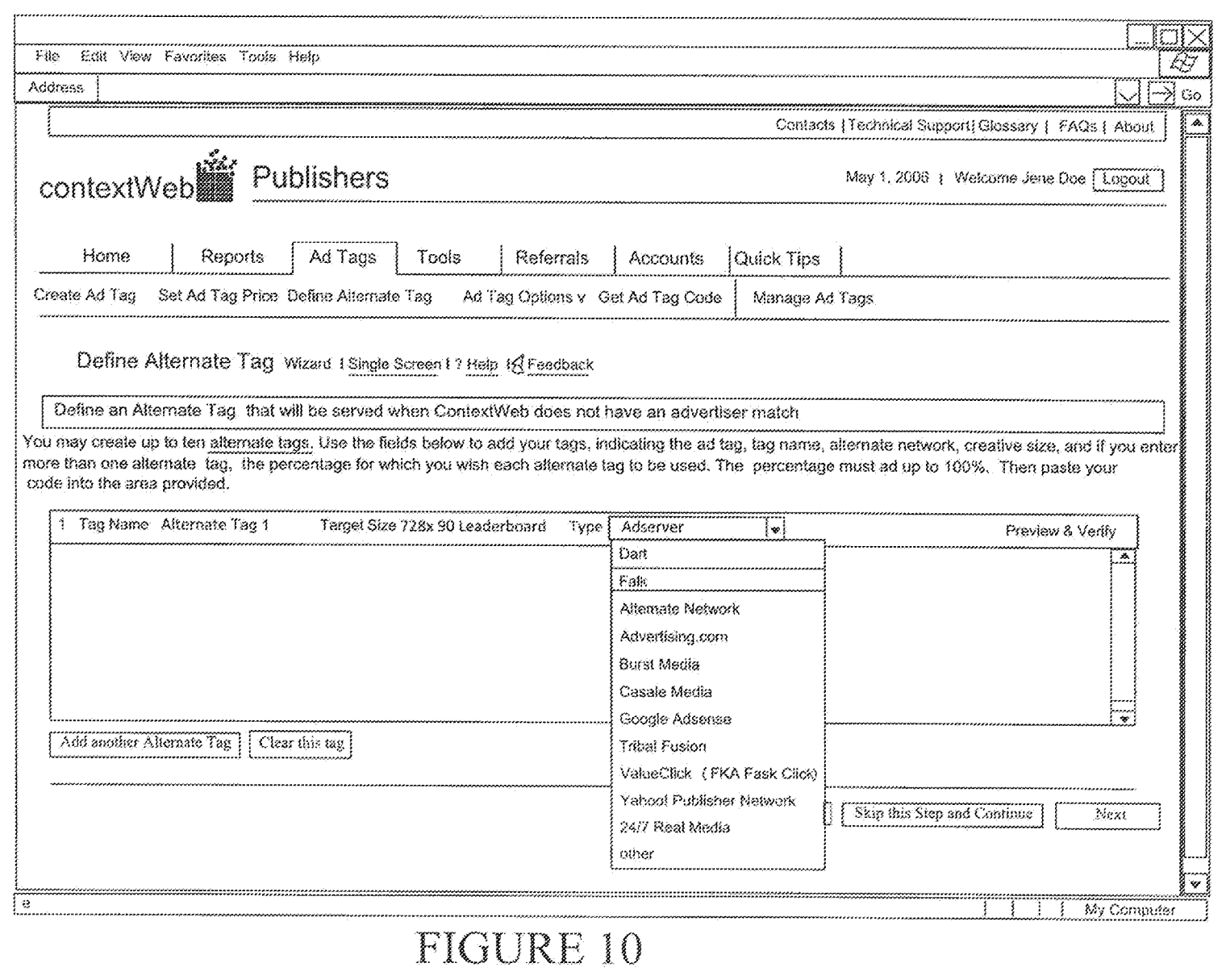
Figure 11:
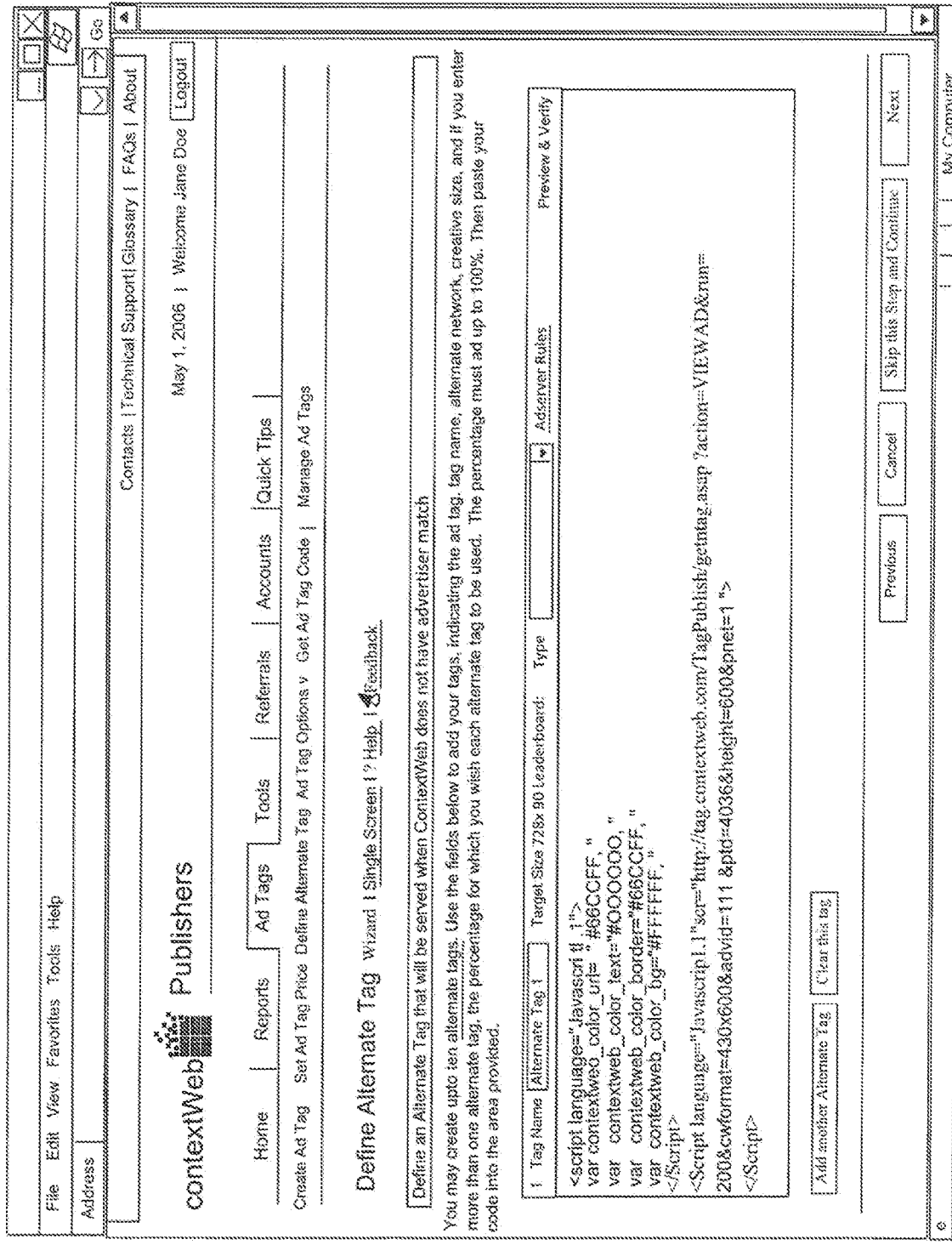

FIGS. 10 and 11 are exemplary GUI user interfaces that a publisher cause to register their passback tag on an OPO Network. In this example the passback tags are called Alternate Tags. The publisher may specify the third-party network where that alternate tag runs, and they may also specify the full content of the tag without selecting a third-party network name.

Figure 12:
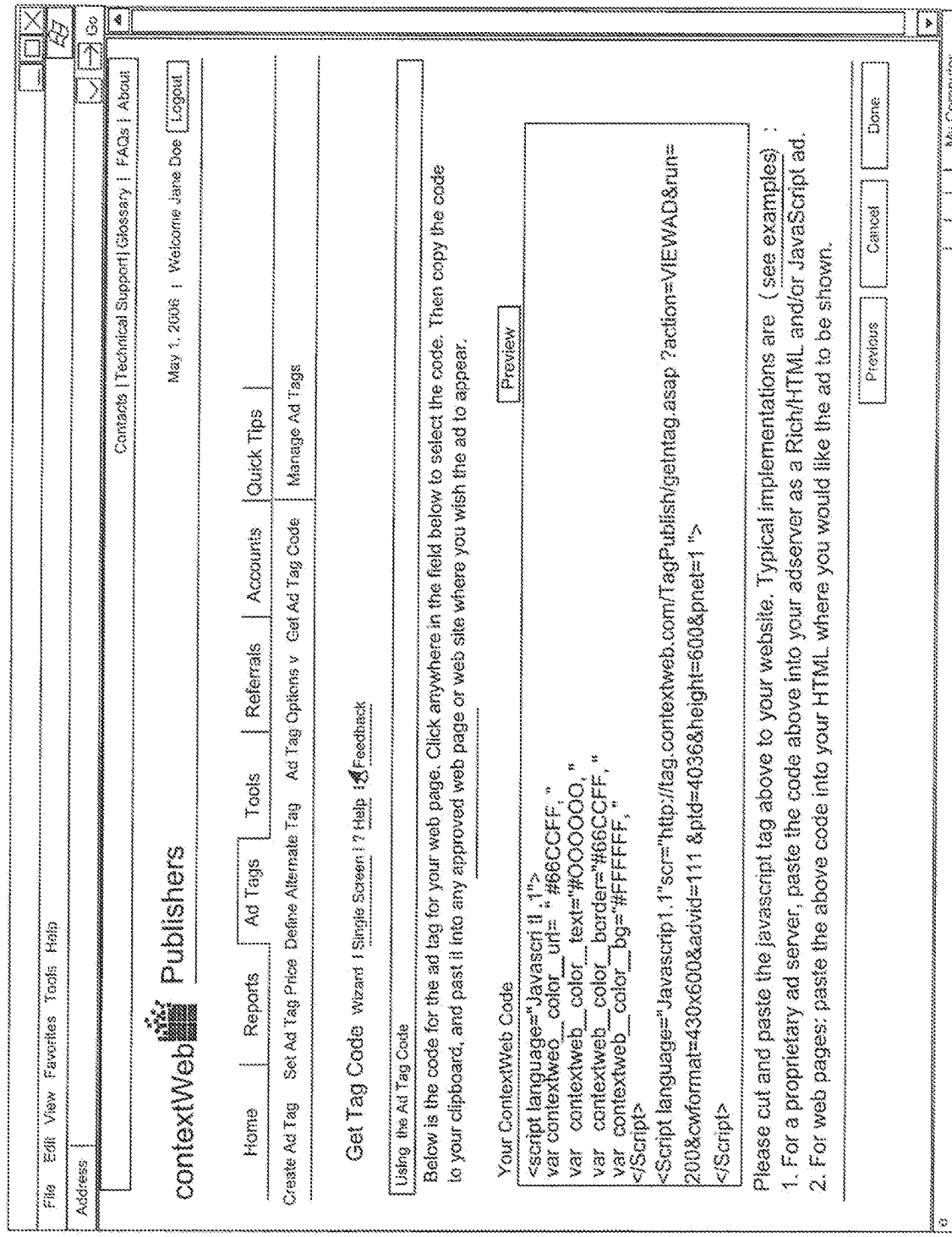
FIG. 12 is an exemplary GUI for interaction with a publisher to retrieve the ad tag from an OPO Network for posting on their web site in order to enable the OPO Network functionality in accordance with one embodiment of the invention.

FIG. 12 is an exemplary GUI user interface that a publisher can use to retrieve the ad tag item an OPO Network that the publisher would need to post onto their web site in order to enable the OPO Network functionality in accordance with one embodiment of the invention.

FIG. 13 is an exemplary GUI user interface that a publisher on an OPO Network can use to setup additional business rules for the network to apply to traffic from the publisher's site or sites. This GUI presents competitive blocking rules that enable the publisher to block ads from competitive organizations.

FIG. 14 is an exemplary GUI user interface that a publisher can use to view and manage the performance of their ad tags across different performance groups.

Figure 15:
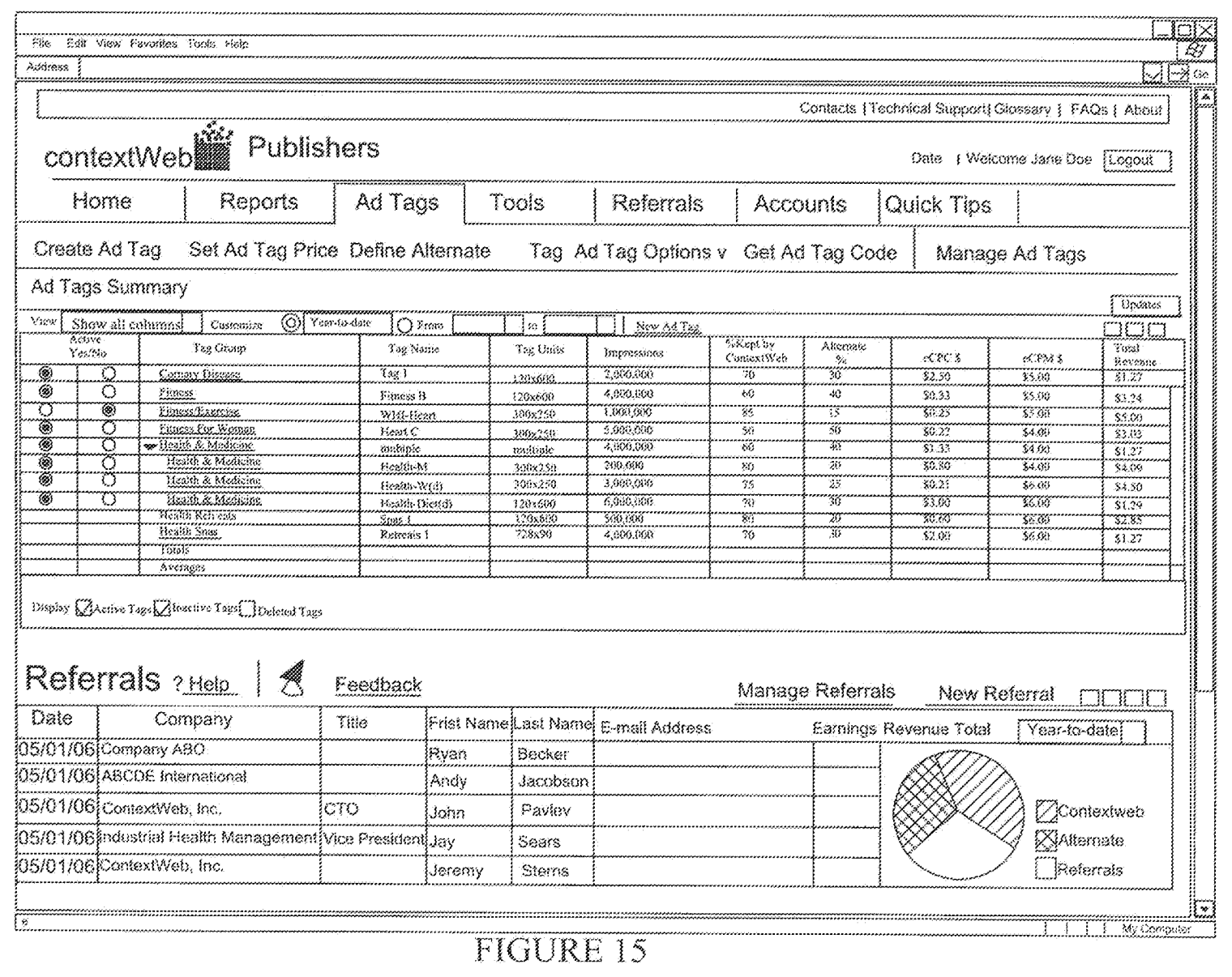

FIG. 15 is an exemplary GUI user interface that a publisher can use to view and manage an advertiser and publisher referrals system in place on an OPO Network. In this further embodiment of the invention, each publisher and advertiser on the network is able to earn referral commissions or credits on the network when they refer new publishers or advertisers who sign up on the network. This GUI provides the publisher with a list of other publishers on the same network that were referred by that publisher.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. An internet-based system for assembling content from multiple web servers for presentation at a web browser over the Internet, the system comprising:

a processor;

a nontransitory memory, having stored therein operating instructions programmed to cause the processor:

to receive ad tags from web publishers, an ad tag being a request for an ad to be delivered over the Internet to fill a region of a page, the page to be served over the Internet to a web browser for delivery to a user's web browser, and to store the received ad tag into a nontransitory memory;

to evaluate the received ad tags against fulfillment rules in a fulfillment rule base, fulfillment rules in the fulfillment rule base having electronic records specifying respective test criteria and corresponding designators of ad content available to be delivered into the respective ad tags, the rules having respective test criteria against which to test received ad tags, and the ad content designators designating ad content to be provided in response to an ad tag satisfying the rule's test criteria;

from among fulfillment rules whose test criteria are met by the received ad tags, to select respective ad content items associated with respective satisfied fulfillment rule(s), and to cause delivery of the selected ad content for integration into pages delivered from the publishers over the Internet, the delivery to web browsers specified by the respective ad tags;

for ad tags for which the evaluation finds that the ad tag fails all fulfillment rules' test criteria, to pass over the Internet a passback tag to the publisher, to the web browser, or to another ad placement computer, in any case, the passback tag being a request whose data requests an alternative attempt to identify ad content to be served over the Internet into the ad tag for integration into the page by the user's browser as specified by the ad tag.

2. The system according to claim 1, wherein:

the evaluating of received ad tags includes evaluating content of at least one of the page currently displayed on the computer display screen, and the content of a page previously displayed on the computer screen.

3. The system according to 1, wherein:

the passback tag is a modified copy of the ad tag passed in a modified form.

4. The system according to 1, wherein:

the passback of the passback tag includes passing the passback tag to the publisher's internet page server.

5. The system according to 1, wherein:

the passback of the passback tag includes passing the passback tag to the user web browser.

6. The system according to 1, wherein:

the passback of the passback tag includes passing the passback tag to a third party content server.

7. The system according to 1, wherein:

the ad tag is subject to a minimum acceptable price set by the publisher, and the evaluation of an ad tag against the criteria results in failure if the maximum price among all content providers whose criteria otherwise meet the ad tag is below the minimum price set by the publisher.

8. The system according to 1, wherein:
the criteria for rules include a price term, and the evaluation of an ad tag against a rule's criteria results in failure if the ad tag price is above a maximum price criterion of the rule.

9. The system according to 1, wherein:
the ad tag is received by an Open Purchase Order network, in which the programs are programmed to receive ad tags and provide content as specified by the rule of the satisfied criterion, without numerical limit.

10. The system of 1, further comprising:
a classification system operable to classify Internet ad traffic into performance groups, wherein advertisement performance within each performance group is measured independently of advertisement performance in other performance groups;
a nontransitory memory including an inventory of advertisements;
wherein the rules in the rule base are operable to match particular ads in the inventory to particular classifications of Internet ad traffic, and to a performance group corresponding to parameters of any ad tag to be matched to the rule; wherein each particular advertisement is associated with one or more ad traffic classifications;
a pricing and optimization engine configured to periodically update ad prices in the advertisement inventory according to pricing rules;
the programs in the memory being further operable to:
from among ad content of rules whose test criteria are met by the received ad tag, including the performance group, to select one or more associated advertisements whose price is greater than or equal to the minimum eCPM price in the publisher rules repository for that publisher and performance group, and further operable to deliver the one or more advertisements for display on the publisher's Internet page server.

11. A method for assembling web pages from multiple Internet servers for delivery to a users' web browsers, comprising the steps of:
at a content server computer of the internet, receiving ad tags over the Internet from web publishers, and storing the received ad tags into a nontransitory memory of the content server computer, an ad tag being a request for content for delivery as part of a page to be served over the Internet from a publisher's web server to a user web browser;
by the content server computer, evaluating the received ad tags against fulfillment rules in a fulfillment rule database, fulfillment rules in the database having respective electronic records specifying respective criteria and corresponding designators, the criteria including criteria against which to test received ad tags, and the designators respectively designating content to be provided over the Internet in response to an ad tag satisfying the corresponding criteria;
for ad tags for which the evaluating found the evaluation to satisfy a criterion of at least one rule of the rule database, providing content over the Internet as specified by the content designator corresponding to at least one of the satisfied criteria; and
for ad tags for which the evaluating found the evaluation to fail all rules' criteria, passing the ad tag over the Internet to the publisher, to the web browser, or to another content server computer, in any case, the passback tag being a request for an alternative attempt to identify content to be served over the Internet into the ad tag for delivery to the web browser as specified by the ad tag.

12. The method of claim 11, wherein:
the ad tag is subject to a minimum acceptable price set by the publisher, and the evaluation of an ad tag against the criteria results in failure if the maximum price among all content providers whose criteria otherwise meet the ad tag is below the minimum price set by the publisher.

13. The method of claim 11, wherein:
the criteria for rules include a price term, and the evaluation of an ad tag against a rule's criteria results in failure if the ad tag price is above a maximum price criterion of the rule.

14. The method of claim 11, wherein:
the ad tag is passed in modified form.

15. The method of claim 11, wherein:
the passback tag includes passing a modified ad tag to the publisher.

16. The method of claim 11, wherein:
the passback tag includes passing a modified ad tag to the web browser.

17. The method of claim 11, wherein:
the passback tag includes passing a modified ad tag to a third party content provider.

18. A system of serving content from multiple web servers for presentation as a web page over the Internet, the system comprising;
a processor;
a nontransitory memory having stored therein operating instructions programmed to cause the processor:
to receive an ad tag from a web publisher's web server, an ad tag being a request to deliver a content item into a page to be served over the Internet to a web browser, and to store the received ad tag into a nontransitory memory;
to evaluate the received ad tag against fulfillment rules in a fulfillment rule base, fulfillment rules in the fulfillment rule base specifying respective test criteria and corresponding designators of content items available to be delivered over the Internet into ad tags, the rules having respective test criteria against which to test received ad tags and content designators designating respective content to be provided in response to an ad tag satisfying the rule's test criteria;
from among fulfillment rules whose test criteria are met by the received ad tag, to select a content item associated with a one of the satisfied fulfillment rule(s), and to cause delivery over the Internet of the selected content item into the page to be delivered from the publisher as specified by the ad tag,
for ad tags for which the evaluation finds that the ad tag fails all fulfillment rules' test criteria, to deliver a passback tag over the Internet to the publisher, to the web browser, or to another content server computer, in any case, the passback tag being a request whose data requests an alternative attempt to identify content to be served over the Internet into the ad tag for integration into the page at the web browser as specified by the ad tag.

19. The system of claim 18, wherein:
the received ad tag is a request to deliver an advertisement to fill the region of the served page.

20. The system in accordance with claim 19, wherein the publisher passback tag is an identical tag that the publisher was previously running on its Internet page server, thereby resulting in the publisher generating the same revenue on passed-back traffic as was generated on all its previous traffic prior.

21. The system according to claim 18, wherein:

the evaluation of the received ad tag includes evaluating content of at least one of the page currently displayed on the computer display screen, and the content of a page previously displayed on the computer screen.

22. The system according to 22, wherein:

the passback tag is a modified copy of the ad tag passed in a modified form.

23. The system according to 22, wherein:

the passback of the passback tag includes passing the passback tag to the publisher's internet page server.

24. The system according to 22, wherein:

the passback of the passback tag includes passing the passback tag to the user web browser.

25. The system according to 22, wherein:

the passback of the passback tag includes passing the passback tag to a third party content server.

26. The system according to 22, wherein:

the ad tag is subject to a minimum acceptable price set by the publisher, and the evaluation of an ad tag against the criteria results in failure if the maximum price among all content providers whose criteria otherwise meet the ad tag is below the minimum price set by the publisher.

27. The system according to 22, wherein:

the criteria for rules include a price term, and the evaluation of an ad tag against a rule's criteria results in failure if the ad tag price is above a maximum price criterion of the rule.

28. The system according to 22, wherein:

the ad tag is received by an Open Purchase Order network, in which the programs are programmed to receive ad tags and provide content as specified by the rule of the satisfied criterion, without numerical limit.

* * * * *